United States Patent Office 3,087,947
Patented Apr. 30, 1963

3,087,947
DIVINYLZINC AND METHOD OF MAKING
Donald J. Foster, South Charleston, and Erich Tobler, Charleston, W. Va., assignors to Union Carbide Corporation, a corporation of New York
No Drawing. Filed Apr. 6, 1960, Ser. No. 20,235
2 Claims. (Cl. 260—429)

This invention relates to new compositions of matter, divinylzinc and divinylcadmium and methods of making them.

Vinyl derivatives of zinc and cadmium heretofore known in the art have all included a halogen or other element in the molecule. It would be most desirable for synthesis purposes, however, to have halogen-free and solvent-free vinyl derivatives of these two metals.

We have now succeeded in making the new compounds divinylzinc and divinylcadmium.

Divinylzinc is a colorless mobile liquid which is spontaneously inflammable in air. It decomposes if maintained at an ambient temperature in the absence of a solvent. It reacts vigorously with compounds containing active hydrogens such as water, alcohols, mercaptans, phenols and carboxylic acids forming ethylene and the appropriate zinc salt. It also reacts with organic carboxylic acid halides to form the correspondingly substituted vinyl ketone and zinc halide. Divinylcadmium is a practically colorless liquid which decomposes vigorously during attempted distillation although it is stable in solution.

According to our process zinc or cadmium is reacted with the vinyl compound of a metal more electronegative than zinc or cadmium, preferably divinyl mercury, according to the equations:

$$(CH_2=CH)_xM + Zn \rightarrow (CH_2=CH)_2Zn + M$$
$$(CH_2=CH)_xM + Cd \rightarrow (CH_2=CH)_2Cd + M$$

wherein M is a metal more electronegative than zinc or cadmium respectively and $x$ is the valence number of the metal.

The process can be carried out in a solvent or in the absence of a solvent. The only other reaction product, metallic mercury, can be readily withdrawn from the reaction vessel to yield the divinyl zinc or cadmium. During the preparation of divinylcadmium, an equilibrium is apparently set up between divinylmercury-cadmium and divinylcadmium-mercury requiring the continuous removal of mercury to drive the reaction to completion. If preferred a solution of divinyl zinc or cadmium in a reaction solvent can be decanted from the dense, immiscible mercury.

While a reaction solvent is not required, it is generally desirable to carry out the reaction in a relatively low boiling hydrocarbon or ether solvent. Suitable solvents include aliphatic and aromatic hydrocarbons such as pentane, hexane, heptane, benzene, toluene, xylene, as well as lower aliphatic ethers, tetrahydrofuran, tetrahydrothiophene, dioxane, ethylene glycol diphenyl ether, diethylene glycol diphenyl ether, and the like. Preferred solvents are aliphatic ethers containing from two to twelve carbon atoms such as methyl ether, methyl ethyl ether, ethyl ether, n-propyl ether, isopropyl ether, n-butyl ether, iso-butyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene glycol diethyl ether, diethylene glycol ethyl butyl ether, diethylene glycol dibutyl ether, diethylene glycol ethyl hexyl ether, and the like. The product, divinylzinc or divinylcadmium can be readily separated from the solvent, as by a reduced pressure distillation such that the temperature remains below about 0° C. The reaction is preferably conducted under an inert atmosphere such as dry nitrogen or carbon dioxide.

The reaction temperature to be employed will depend on whether or not a solvent is employed in the process. In the absence of a solvent the temperature is preferably kept below about 0° C. to prevent decomposition of the product, although extremely low temperatures adversely affect the reaction rate and thus temperatures below —25° C. should be avoided. With a solvent present it is preferred to use a temperature of room temperature or above in order to increase the reaction rate. Temperatures above about 80° C. are to be avoided as they do not increase the reaction rate but result in increased decomposition of the product.

The ratio of reactants is not critical. While approximately stoichiometric amounts are ordinarily employed the relative quantities can be varied greatly without adverse effect.

In a preferred embodiment of the invention divinylmercury, either alone or dissolved in pentane, is added to metallic zinc or cadmium covered with pentane. An inert atmosphere of dry nitrogen or carbon dioxide is employed. Ambient temperature is sufficient although slight warming may be employed. The reaction is slightly exothermic and the zinc or cadmium disappears with the concurrent deposition of metallic mercury. Approximately equivalent amounts of divinylmercury and metallic zinc or metallic cadmium are employed and the termination of the reaction is therefore evidenced by the absence of metallic zinc and formation of a pool of metallic mercury.

The divinylmercury used in the process may be made by adding mercuric chloride to vinylsodium in a solvent such as butyl ether.

Divinylzinc and divinylcadmium are useful as intermediates for organic synthesis. They are also useful as vinylating agents, particularly for the formulation of vinyl substituted ketones of the formula:

$$CH_2=CH-CO-R$$

wherein R is alkyl or aryl. This reaction can be represented by the equation:

$$(CH_2=CH)_2M + 2R-\overset{O}{\underset{\|}{C}}-Cl \longrightarrow 2CH_2=CH-\overset{O}{\underset{\|}{C}}-R + 2ZnCl_2$$

wherein M is zinc or cadmium and R is alkyl or aryl. For example, acetyl chloride can be mixed with an approximately stoichiometric quantity of divinyl zinc or divinyl cadmium in solution and if the resulting reaction mixture is heated at a temperature of about 50° C. for about one hour a good yield of methyl vinyl ketone will be obtained.

*Example I*

A mixture consisting of 6.5 grams (0.1 gram atom) of zinc, 25.5 grams (0.1 mol) of divinylmercury and 250 milliliters of n-pentane was stirred and heated to reflux in an inert atmosphere of dry nitrogen. Within a short period of time droplets of metallic mercury appear in the reaction vessel and after about four hours a pool of liquid mercury had collected in the bottom of the vessel. A total of 18.5 grams of mercury (92.5 percent of theory) remained after the supernatant liquid was removed. This supernatant liquid was then filtered in a dry box containing high purity nitrogen. The pentane was removed by distillation at a temperature of —15° C. under reduced pressure leaving a practically colorless mobile liquid residue of divinyl zinc, which fumes strongly in air.

As further proof of the identity of the divinyl zinc the temperature of the residual material was gradually increased to above 0° C., whereupon a white solid was slowly deposited on the walls of the vessel. Water was added to hydrolyze the product and the gas evolved was collected and upon analysis in a mass spectrometer was found to be composed almost exclusively of ethylene. The residue from the hydrolysis was identified as zinc hydroxide. It was further determined by experiment that the vinyl groups cannot be hydrolyzed off of divinylmercury under the conditions of the reaction.

*Example II*

A mixture consisting of 6.5 grams (0.1 gram atom) of zinc, 25.5 grams (0.1 mol) of divinylmercury and 200 milliliters of toluene was stirred and heated to reflux in an inert atmosphere of dry nitrogen. After heating for four hours at a temperature of 80° C. the reaction mixture was cooled to room temperature and a pool of liquid mercury was removed from the base of the reaction flask. A total of 17.4 grams of metallic mercury, 87 percent of theory, was obtained, indicating an 87 percent yield of divinyl zinc. The supernatant liquid was cooled to 0° C. and to this solution was added drop-wise 15.6 grams (0.2 mol) of acetyl chloride dissolved in 25 milliliters of dry toluene. The reaction mixture was warmed slowly to room temperature and then heated to 50° C. for one hour. The reaction mixture was filtered and, after stabilization with 0.2 gram of caterhol, distilled at atmospheric pressure. Methyl vinyl ketone, boiling at a temperature of 80 to 82° C. with $n_D^{20}$ of 1.4088 was obtained in a 69 percent yield. It was compared chemically and spectroscopically with an authentic sample and shown to be identical.

*Example III*

A mixture of 3.3 grams (0.05 gram atom) of zinc, 12.7 grams (0.05 mol) of divinylmercury and 0.1 gram of metallic mercury was added to an evacuated pyrex tube and sealed off. The tube was heated slowly to a temperature of 80° C. At this temperature there was an instantaneous reaction producing pyrophoric divinylzinc.

*Example IV*

A mixture consisting of 11.2 grams (0.1 gram atom) of cadmium, 25.5 grams (0.1 mol) of divinylmercury and 250 milliliters of hexane were stirred at room temperature in an inert atmosphere of dry nitrogen. Within a short period of time droplets of metallic mercury appear in the reaction vessel. By taking advantage of the difference in density of cadmium and mercury, the latter metal was selectively removed from the bottom of the reaction vessel by means of a stopcock. Removal of the mercury shifted the equilibrium of the reaction to produce more divinylcadmium and it was thereby possible to recover over 72 percent of the contained mercury as the free metal. The divinylcadmium thus produced was found to react with either water or alcohol to yield ethylene and the metal salt; divinylmercury does not react with these agents under the same conditions.

What is claimed is:

1. Process for making divinylzinc which comprises reacting zinc with divinylmercury, the reaction being carried out under an inert atmosphere in a solvent reaction medium, said solvent being an aliphatic ether containing from two to twelve carbon atoms and removing the mercury from the reaction system to drive the reaction to completion.

2. Process for making divinylcadmium which comprises reacting cadmium with divinylmercury, the reaction being carried out under an inert atmosphere in a solvent reaction medium, said solvent being an aliphatic ether containing from two to twelve carbon atoms and removing the mercury from the reaction system to drive the reaction to completion.

References Cited in the file of this patent

UNITED STATES PATENTS

| | | |
|---|---|---|
| 2,272,133 | Shappiro | Feb. 3, 1942 |
| 2,969,381 | Blitzer et al. | Jan. 24, 1961 |

OTHER REFERENCES

American Chemical Society, Abstract of Papers, Brinckman et al., 135th meeting, 1959 (p. 26M).

Bartoche et al.: Proceedings of the Chemical Society, p. 116 (1958).

Coates: Organo-Metallic Compounds, pp. 37 and 41 (1956).